United States Patent [19]

Preussmann et al.

[11] Patent Number: 5,158,805
[45] Date of Patent: Oct. 27, 1992

[54] REDUCTION OF NITROSAMINE FORMATION IN THE VULCANIZATION OF RUBBERS

[75] Inventors: Rudolf Preussmann, Eppelheim; Bertold Spiegelhalder, Heidelberg-Wieblingen, both of Fed. Rep. of Germany

[73] Assignee: Rhein Chemie Rheinau GmbH, Mannheim, Fed. Rep. of Germany

[21] Appl. No.: 681,911

[22] Filed: Apr. 8, 1991

[30] Foreign Application Priority Data

Apr. 21, 1990 [DE] Fed. Rep. of Germany ....... 4012797

[51] Int. Cl.⁵ ............... B05D 3/04; B29B 15/10
[52] U.S. Cl. .................... 427/220; 264/134; 264/349; 423/460; 427/255; 427/255.6; 523/200
[58] Field of Search ............ 523/215, 351, 200; 427/215, 255, 220, 248.1, 255.6; 264/130, 134, 236, 315, 349, 347, 326, 331.13; 423/460

[56] References Cited

U.S. PATENT DOCUMENTS 1,730,485 10/1929 Teague .
4,721,740 1/1988 Takeshita et al. ............. 523/215
4,764,547 8/1988 Hatanaka et al. ............. 523/215
5,070,130 12/1991 Chasar .......................... 524/436

FOREIGN PATENT DOCUMENTS 638294 6/1950 United Kingdom .
1054620 11/1967 United Kingdom .

OTHER PUBLICATIONS

Kautschuk und Gummi Kunststoffe, 42:No. 1; 16–21, (1989).

Primary Examiner—Jeffery Thurlow
Assistant Examiner—Mathieu Vargot
Attorney, Agent, or Firm—Connolly and Hutz

[57] ABSTRACT

A method for reducing the formation of nitrosamines during the vulcanization of rubber mixes which includes treating of the inorganic additives used for the rubber mix to be vulcanized—primarily carbon blacks, zinc oxide and/or silicates—with ammonia or with a primary amine.

3 Claims, No Drawings

REDUCTION OF NITROSAMINE FORMATION IN THE VULCANIZATION OF RUBBERS

The problems caused by the formation of nirosamines during the vulcanization of rubbers have long been known. Some nitrosamines are carcinogenic, so that their formation or presence must be prevented. In September, 1988, legislation was introduced in Germany to reduce the concentration of nitrosamines at the workplace to at most 2.5 mg/m$^3$.

In the vulcanization of rubber, nitrosamines are primarily formed by the nitrosation of secondary amines. These secondary amines are in turn cleavage products of the accelerator required for vulcanization. Oxides of nitrogen (NO$_x$) are present in the air and also in components of the rubber mix.

In order to prevent or at least reduce the formation of nitrosamines during the vulcanization of rubber, in principle it is possible

- to avoid secondary amines,
- to eliminate nitrosating agents,
- to avoid conditions favorable to nitrosamine formation,
- to remove nitrosamines formed.

Of these possibilities, only the first and second are of any practical value.

The present invention makes use of the second possibility, i.e. avoiding nitrosating agents. The present invention is based on the discovery that a considerable percentage of the "nitrosation potential" in such rubber mixes is to be found in the inorganic additives present therein. The additives in question are, primarily, carbon blacks having large surfaces, zinc oxides and silicates having large surfaces. These additives contain the "nitrosation potential" at least partly in the form of adsorbed nitrogen oxides or nitrite. This nitrosation potential can be released during the vulcanization process and is then able to react with the secondary amine formed from the vulcanization accelerator to form nitrosamine (secondary amines are also formed on heating from typical vulcanization accelerators, such as sulfenamides, thiurams and carbamates).

The formation of nitrosamines can be prevented or at least reduced by inhibiting or destroying the nitrosation potential present in the inorganic additives.

Accordingly, the present invention relates to a method for reducing nitrosamine formation in the vulcanization of rubber mixtures, characterized in that the inorganic additives used for the rubber mix to be vulcanized, primarily carbon blacks, zinc oxide and/or silicates, are pretreated with ammonia or with a primary amine.

In this way, nitrosation potential (such as NO$_x$ or nitrite) present in the additives does not react with secondary amines during vulcanization, but instead with ammonia or primary amines. The reaction products formed are unstable and decompose with formation of nitrogen.

The pretreatment according to the invention generally leads to lasting inhibition or elimination of the nitrosation potential, at least when ammonia or primary amine remains in the additives, for example by adsorption.

There are several method known in principle for the treatment of the inorganic additives. The particular procedure adopted will of course depend upon the type of additive and upon the properties of the amine.

If ammonia is used, the additive may simply be treated with gaseous ammonia at room temperature and atmospheric pressure. The same procedure may be adopted where low-boiling or gaseous primary amines are used. If the amines are liquid, they may be mixed with the additives in the form of solutions in organic solvents and the organic solvent subsequently removed. Ultimately, it is even possible to mix mechanically relatively high boiling primary amines with the fillers in standard mixing units. In either case, it is merely important to ensure that the amines are homogeneously mixed with the additives.

In addition to ammonia, primary aliphatic amines are preferred for the present invention. Alkyl monoamines containing 1 to 20 carbon atoms in the alkyl group, alkylenediamines containing 2 to 20 carbon atoms in the alkylene group and alkyl monoamines containing other functional groups, such as hydroxyl groups, are particularly preferred. Examples of such amines are octyl amine, ethylenediamine, diaminpheptane and ethanolamine. In general, the additives may be treated with ammonia or amine in quantities of the order of 0.01 to 5% by weight of the additive. The use of the additives treated in accordance with the invention in the vulcanization of vulcanizable rubber mixes significantly reduces or even completely prevents the formation of nitrosamines.

EXAMPLE

Treatment of an Additive 100 g furnace black (N 200) were introduced into a one liter Erlenmeyer flask and the air present was completely displaced by introduction of gaseous ammonia. The vessel was stoppered and left standing with occasional shaking.

1.0 g of the carbon black used treated were mixed with 10 ml of a paraffin oil and 100 mb "Accelerator MOZ" were added to the resulting mixture. The mixture was then heated with stirring to 150° C. and kept at that temperature for 30 minutes. The quantity of nitrosomorpholine formed is analytically determined as 0.1 μg.

When this test was repeated with a non-pretreated carbon black, 3.0 μg nitrosomorpholine were found.

This model test, which simulates the vulcanization of rubber, shows that the pretreated material leads to a nitrosamine content by about 97%.

We claim:

1. A method for preventing the formation of nitrosamine in the vulcanization of rubber mixes, which contain a secondary amine releasing vulcanization accelerator which comprises pretreating inorganic additives for the rubber mixes to be vulcanized with ammonia or with a primary aliphatic amine to thereby reduce the formation of nitrosamines by inhibiting the nitrosation potential present in the inorganic additives.

2. A method as claimed in claim 1, in which the inorganic additives are selected from the group consisting of carbon blacks, zinc oxides and silicates.

3. A method as claimed in claim 1, in which pretreatment is with a member selected from the group consisting of ammonia, diaminoheptane and ethanolamine.

* * * * *